(12) United States Patent
Kim et al.

(10) Patent No.: US 10,074,833 B2
(45) Date of Patent: Sep. 11, 2018

(54) ELECTRONIC DEVICE

(71) Applicant: Samsung Electronics Co., Ltd., Suwon-si, Gyeonggi-do (KR)

(72) Inventors: Seong Hyeon Kim, Gumi-si (KR); Jung Bae Park, Daegu (KR); Yong Won Cho, Gumi-si (KR); Hyo Won Seo, Pohang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/672,717

(22) Filed: Mar. 30, 2015

(65) Prior Publication Data

US 2015/0280181 A1 Oct. 1, 2015

(30) Foreign Application Priority Data

Mar. 28, 2014 (KR) .................. 10-2014-0036423

(51) Int. Cl.
| | |
|---|---|
| *H01M 2/10* | (2006.01) |
| *G06F 1/16* | (2006.01) |
| *H04B 1/3883* | (2015.01) |
| *H04M 1/02* | (2006.01) |

(52) U.S. Cl.
CPC ........ *H01M 2/1022* (2013.01); *G06F 1/1635* (2013.01); *H01M 2/1066* (2013.01); *H04B 1/3883* (2013.01); *H04M 1/0262* (2013.01); *H01M 2220/30* (2013.01)

(58) Field of Classification Search
CPC ............ H01M 2220/30; G06F 1/1635; H04M 1/0262
USPC ...... 361/679.58, 679.33, 679.55; 248/221.11
See application file for complete search history.

(56) References Cited

U.S. PATENT DOCUMENTS

| | | | | |
|---|---|---|---|---|
| 6,421,233 | B1* | 7/2002 | Hong | G06F 1/1626 |
| | | | | 361/679.55 |
| 7,500,867 | B1* | 3/2009 | Doglio | H01R 13/5812 |
| | | | | 248/251 |
| 7,782,603 | B2* | 8/2010 | Curnalia | G11B 33/122 |
| | | | | 361/679.33 |
| 2007/0099470 | A1* | 5/2007 | Yang | H05K 7/1404 |
| | | | | 439/326 |
| 2007/0270194 | A1* | 11/2007 | Park | H04M 1/0262 |
| | | | | 455/575.1 |
| 2010/0103594 | A1 | 4/2010 | Wang | |
| 2010/0143780 | A1* | 6/2010 | Yang | H01M 2/1061 |
| | | | | 429/100 |
| 2013/0201626 | A1* | 8/2013 | Bondurant | G06F 1/1658 |
| | | | | 361/679.58 |
| 2013/0258660 | A1* | 10/2013 | Kim | F21V 21/00 |
| | | | | 362/235 |

FOREIGN PATENT DOCUMENTS

| | | |
|---|---|---|
| KR | 10-2005-0032783 A | 4/2005 |
| KR | 10-0855868 B1 | 9/2008 |

\* cited by examiner

*Primary Examiner* — Mandeep S Buttar
(74) *Attorney, Agent, or Firm* — Jefferson IP Law, LLP

(57) ABSTRACT

An electronic device is provided. The electronic device includes an electronic device body including a settling part located at a side of the electronic body, a battery member coupled to the settling part of the electronic device body, one or more hook joining part located at a side of the electronic device body, and one or more hook member located around the battery member and detachably coupled with the one or more hook joining part.

13 Claims, 8 Drawing Sheets

ELECTRONIC DEVICE

CROSS-REFERENCE TO RELATED APPLICATION(S)

This application claims the benefit under 35 U.S.C. § 119(a) of a Korean patent application filed on Mar. 28, 2014 in the Korean Intellectual Property Office and assigned Serial No. 10-2014-0036423, the entire disclosure of which is hereby incorporated by reference.

TECHNICAL FIELD

The present disclosure relates to an electronic device. More particularly, the present disclosure relates to an electronic device including a settling part for a battery member.

BACKGROUND

An electronic device (e.g., a portable computer, a laptop computer, a Personal Digital Assistant (PDA), a mobile phone, a digital camera, and so on) is being widely used based on its merits of portability and mobile usability.

To support the portability of such an electronic device, it is necessary to ensure a power supply thereto, even while a user is moving with the electronic device, as well as to equip the electronic device with a battery.

An electronic device such as a tablet computer is generally equipped with a battery that is secured by a mechanical device, such as a screw.

However, using a screw may increase the product cost of the battery and/or the electronic device.

Moreover, as the number of processing steps becomes larger and a time for fabricating the electronic device becomes longer, it may decrease the efficiency of a manufacturing process of the device.

Besides, some electronic devices with a battery secured with a screw may be involved in an accident wherein the screw or an accompanying mounting part is unscrewed from the device. Such damage may occur in a practical usage condition such as by repetitive dropping.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device capable of accomplishing the requirements arising from the aforementioned problems.

Another aspect of the present disclosure is to provide an electronic device capable of reducing the number of processing steps and a fabrication time thereof, while curtailing a product cost and preventing a battery from separation in practical use such as repetitive dropping.

In accordance with an aspect of the present disclosure, an electronic device is provided. The electronic device includes an electronic device body including a settling part located at a side of the electronic body, a battery member coupled to the settling part of the electronic device body, one or more hook joining part located at a side of the electronic device body, and one or more hook members located around the battery member and detachably coupled with the one or more hook joining part.

In accordance with another aspect of the present disclosure, an electronic device is provided. The electronic device includes an electronic device body including a settling part located at a side of the electronic body, a battery member coupled to the settling part of the electronic device body, one or more hook joining part located at one side and another side of the electronic device body, and one or more hook member located respectively at one side and another side of the battery member and detachably coupled with the one or more hook joining part.

In accordance with another aspect of the present disclosure, an electronic device is provided. The electronic device includes an electronic device body in which a settling part is located at a side of the electronic device body and a battery member coupled to the settling part of the electronic device body. The battery member may be coupled with the electronic device body in a form of a hook combination.

In accordance with an aspect of the present disclosure, costs of component materials may be reduced by using a hook joining part, which is part of an electronic device body, coupled with a hook member, which is located around a battery member, in a form of an interactive hook combination.

In accordance with another aspect of the present disclosure, fabrication time of a device may be reduced by reducing the number of processing steps, and shortening a time for rotating a set fabrication line by joining a battery member with an electronic device body in a form of a hook combination.

In accordance with another aspect of the present disclosure, it may be advantageous to stably maintain a state of installment with a battery member in practical use such as repetitive dropping by joining a battery member with an electronic device body in a form of a hook combination.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
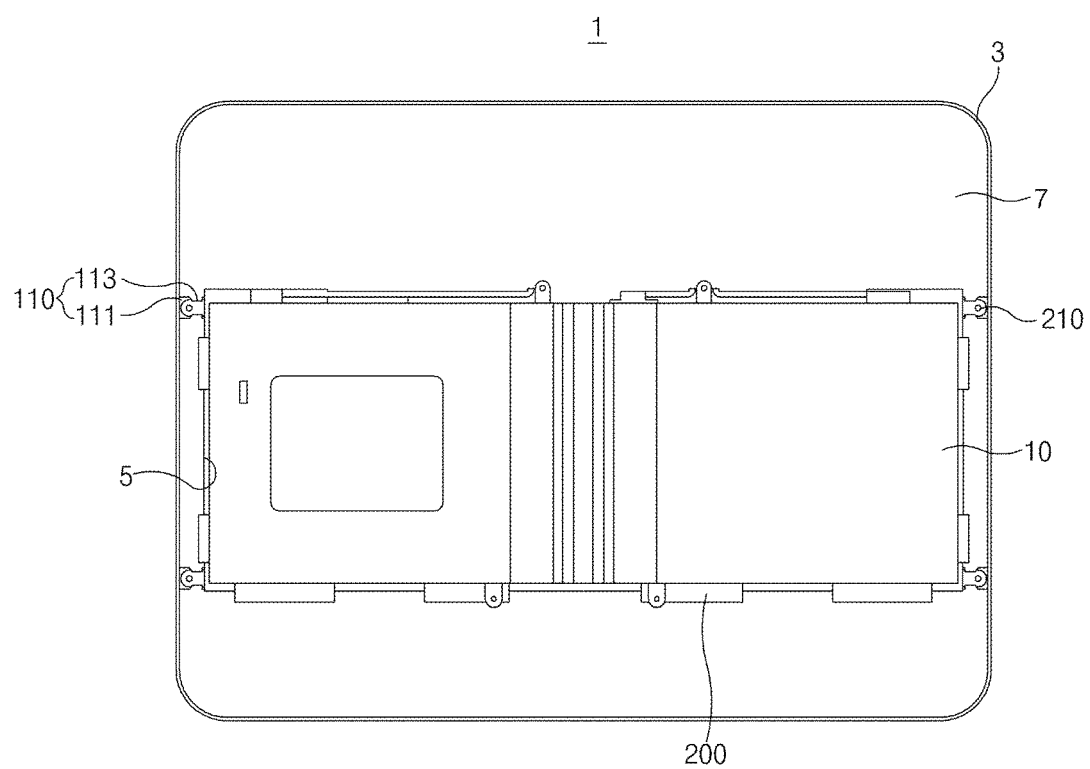
FIG. 1 is a plan diagram illustrating an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms "include," "comprise," "have," "may include," "may comprise" and "may have" used herein indicate disclosed functions, operations, or the existence of elements but do not exclude other functions, operations or elements. Additionally, in this specification, the meaning of "include," "comprise," "including," or "comprising," specifies a property, a region, a fixed number, an operation, a process, an element and/or a component but does not exclude other properties, regions, fixed numbers, operations, processes, elements and/or components.

The meaning of the term "or" used herein includes any or all combinations of the words connected by the term "or." For instance, the expression "A or B" may indicate include A, B, or both A and B. As used herein, the term "and/or" includes any and all combinations of one or more of the associated listed items.

The terms such as "1st," "2nd," "first," "second," and the like used herein may refer to modifying various different elements of various embodiments of the present disclosure, but do not limit the elements. For instance, such terms do not limit the order and/or priority of the elements. Furthermore, such terms may be used to distinguish one element from another element. For instance, both "a first user device" and "a second user device" indicate a user device but indicate different user devices from each other. For example, a first component may be referred to as a second component and vice versa without departing from the scope of the present disclosure.

In the description below, when one part (or element, device, etc.) is referred to as being "connected" to another part (or element, device, etc.), it should be understood that the former can be "directly connected" to the latter, or "electrically connected" to the latter via an intervening part (or element, device, etc.). It will be further understood that when one component is referred to as being "directly connected" or "directly linked" to another component, it means that no intervening component is present.

Terms used in this specification are used to describe embodiments of the present disclosure and are not intended to limit the scope of the present disclosure.

Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal sense unless expressly so defined herein in various embodiments of the present disclosure.

An electronic device according to various embodiments of the present disclosure may have a communication function. For instance, electronic devices may include at least one of smartphones, tablet Personal Computers (PCs), mobile phones, video phones, electronic book (e-book) readers, desktop PCs, laptop PCs, netbook computers, Personal Digital Assistants (PDAs), Portable Multimedia Players (PMPs), Moving Picture Experts Group Audio Layer 3 (MP3) players, mobile medical devices, cameras, and wearable devices (e.g., Head-Mounted-Devices (HMDs) such as electronic glasses, electronic apparel, electronic bracelets, electronic necklaces, electronic appcessory, electronic tattoos, and smart watches).

According to various embodiments of the present disclosure, an electronic device may be smart home appliances having a communication function. The smart home appliances may include at least one of, for example, televisions (TVs), Digital Versatile Disc (DVD) players, audio devices, refrigerators, air conditioners, cleaners, ovens, microwave ovens, washing machines, air cleaners, set-top boxes, TV boxes (e.g., Samsung HomeSync™, Apple TV™ or Google TV™), game consoles, electronic dictionaries, electronic keys, camcorders, and electronic picture frames.

According to various embodiments of the present disclosure, an electronic device may include at least one of various medical devices (for example, Magnetic Resonance Angiography (MRA) devices, Magnetic Resonance Imaging (MRI) devices, Computed Tomography (CT) devices, medical imaging devices, ultrasonic devices, etc.), navigation devices, Global Positioning System (GPS) receivers, Event Data Recorders (EDRs), Flight Data Recorders (FDRs), vehicle infotainment devices, marine electronic equipment (for example, marine navigation systems, gyro compasses, etc.), avionics, security equipment, car head units, industrial or household robots, financial institutions' Automated Teller Machines (ATMs), and stores' Point Of Sale (POS) systems.

According to an embodiment of the present disclosure, an electronic device may include at least one of furniture or buildings/structures having a communication function, electronic boards, electronic signature receiving devices, projectors, or various measuring instruments (for example, water, electricity, gas, or radio signal measuring instruments). An electronic device according to an embodiment of the present disclosure may be one of the above-mentioned various devices or a combination thereof. Additionally, an electronic device according to an embodiment of the present disclosure may be a flexible device. Furthermore, it is apparent to those skilled in the art that an electronic device according to an embodiment of the present disclosure is not limited to the above-mentioned devices.

In the description below, it will be understood that when an element such as a layer, region, substrate, plate, or member is referred to as being "on" another element, it can be directly on the other element or intervening elements may be present. In contrast, the term "directly" means that there are no intervening elements.

Hereinafter, an electronic device according to various embodiments of the present disclosure will be described in more detail with reference to the accompanying drawings. The term "user" in various embodiments of the present disclosure may refer to a person using an electronic device or a device using an electronic device (for example, an artificial intelligent electronic device).

FIG. 1 is a plan diagram illustrating an electronic device according to an embodiment of the present disclosure.

Referring to FIG. 1, the electronic device 1 may include an electronic device body 3 having a settling part 5 located at a side thereof, a battery member 10 placed at (e.g., coupled to) the settling part 5 to supply power to the electronic device body 3, a hook joining part 110 configured to join with (e.g., couple to) the settling part 5 at the side of the electronic device body 3, and a hook member 210 configured to join with (e.g., couple to) the hook joining part 110 around the battery member 10.

The settling part 5 may be caved (e.g., indented) at a side of the electronic device body 3 to receive the battery member 10 inside, and configured to enable the battery member 10 to supply power to the electronic device 1 by electrical connection between the battery member 10 and the inside of the electronic device body 3.

A battery frame part 200 may be prepared around the battery member 10.

The battery frame part 200 may be formed along the circumference of the battery member 10, or formed along a part of the circumference of the battery member 10, for example, at both sides of the battery member 10 and facing each other.

For example, the battery frame part 200 may be made of a resin, such as plastic, and formed as a body together with the battery member.

If the battery frame part 200 is made of a resin, the battery member 10 may be protected by virtue of elasticity of the battery frame part 200.

The hook member 210 may be formed as a body together with the battery frame part 200 and protruded from the battery frame part 200.

The hook member 210 may be formed in plurality (i.e., one or more) at both sides, wherein the one or more hook members 210 may face each other in the battery member 10. Further, the one or more hook member 210 may be coupled with the hook joining part 110 to enable the battery member 10 to be stably equipped while the battery member 10 is sitting on or otherwise coupled to the settling part 5.

A front member 7 may be formed in a side of the electronic device body 3. The front member 7 may be formed in a body together with the electronic device body 3, or attached to a side of the front member 7.

The front member 7 may be made of an elastic resin such as plastic.

The hook joining part 110 may be in plurality (i.e., at least one or more) in the front member 7. The hook joining part 110 may be connected with the settling part 5 and correspond with the hook member 210.

Figure 2:
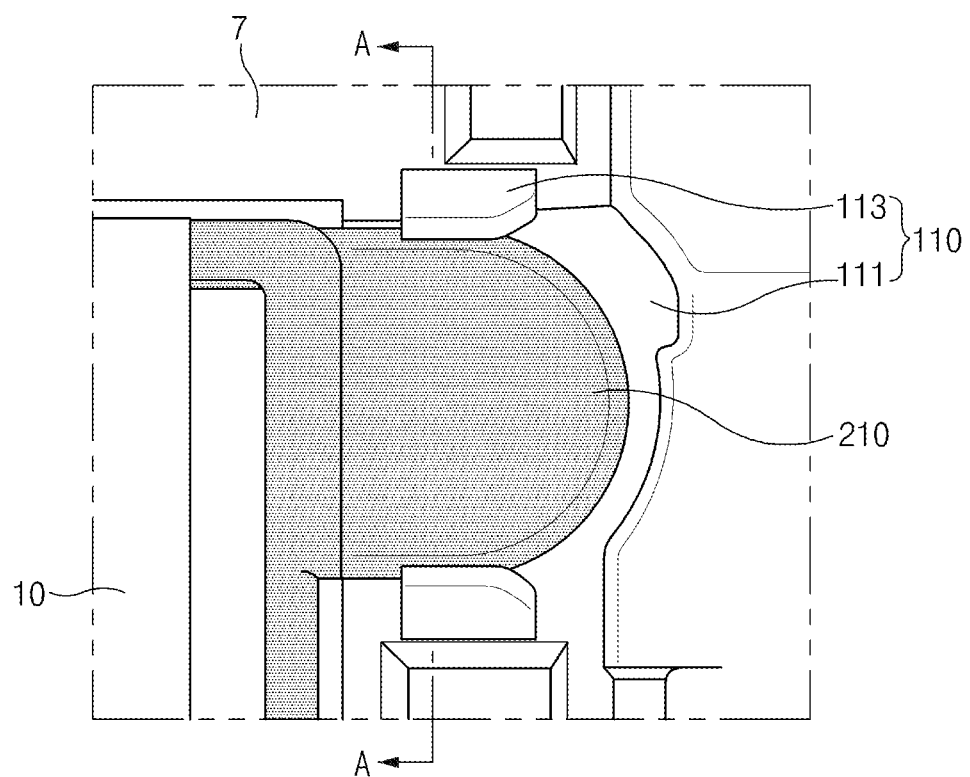
FIG. 2 is an explosive diagram illustrating a portion at which a hook joining part is connected with a hook member, such as the hook member in FIG. 1, according to an embodiment of the present disclosure.

FIG. 2 is an explosive diagram illustrating a portion at which a hook joining part is connected with a hook member, such as the hook member in FIG. 1, according to an embodiment of the present disclosure.

Figure 3:
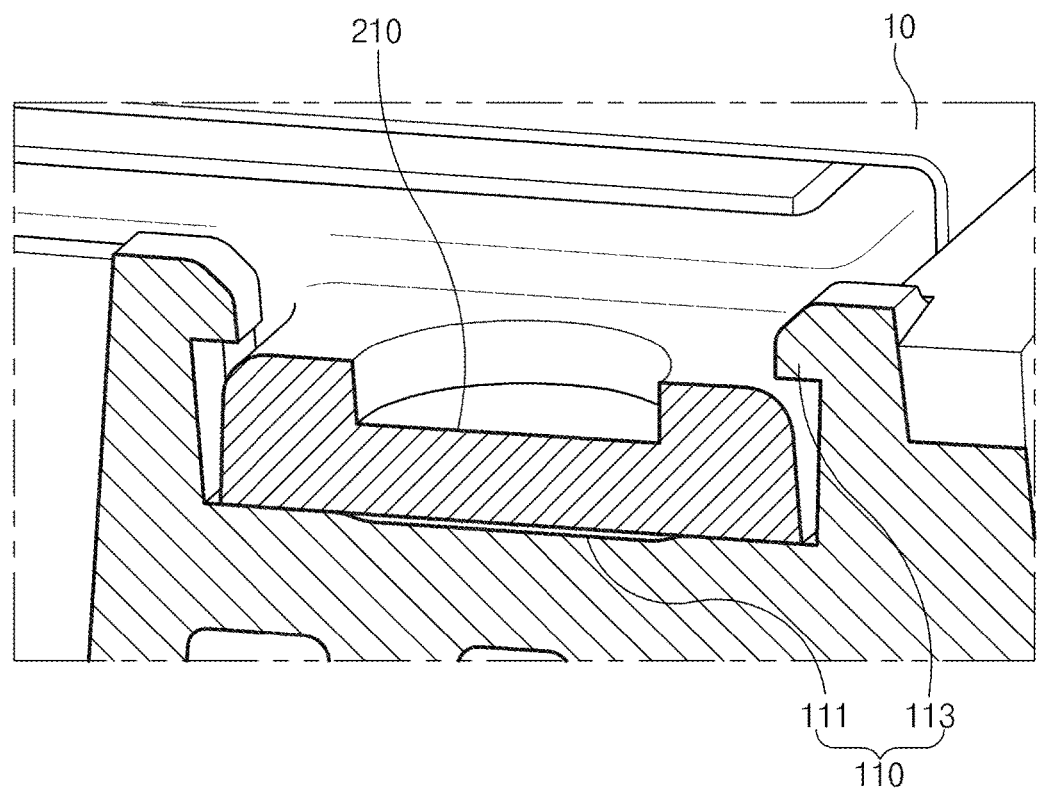
FIG. 3 is a sectional view taken in the direction "A" of FIG. 2 according to an embodiment of the present disclosure.

FIG. 3 is a sectional view taken in the direction "A" of FIG. 2 according to an embodiment of the present disclosure.

Referring to FIGS. 2 and 3, the hook joining part 110 may include a joining groove 111 which is caved (e.g., indented) from a side of the front member 7 to settle (e.g. couple to, attach to, receive, etc.) the hook member 210 inside, and a joining projection 113 which extends from one or both sides of the joining groove 111 to prevent separation of the hook member 210 from the joining groove 111.

As illustrated in FIG. 3, the joining projection 113 may be formed to protrude from, especially, an outer end of both sides of the joining groove 111.

Figure 4:
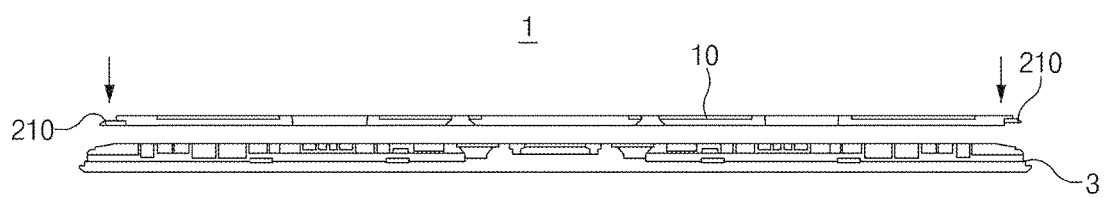
FIG. 4 is a diagram illustrating a feature of equipping a battery member in an electronic device body according to an embodiment of the present disclosure.

FIG. 4 is a diagram illustrating a feature of equipping a battery member in an electronic device body according to an embodiment of the present disclosure.

Referring to FIG. 4, in an electronic device 1 according to an embodiment of the present disclosure, the battery member 10 may be inserted into the inside from the outside of the settling part 5 toward the arrow direction.

Referring to FIGS. 1 to 3, in coupling the hook member 210 to the hook joining part 110, the hook member 210 may be settled in the joining groove 111 after passing the joining projection 113. When the hook member 210 is passing the joining projection 113, the joining projection 113 may be elastically deformed and then recover to essentially its original position.

Additionally, referring to FIG. 3, for guiding the hook member 210 to couple with the hook joining part 110, an upper end of the joining projection 210 may be rounded. To prevent separation of the hook member 210 from the hook joining part 110, a lower end of the joining projection 113 may be shaped having a right angle.

Figure 5:
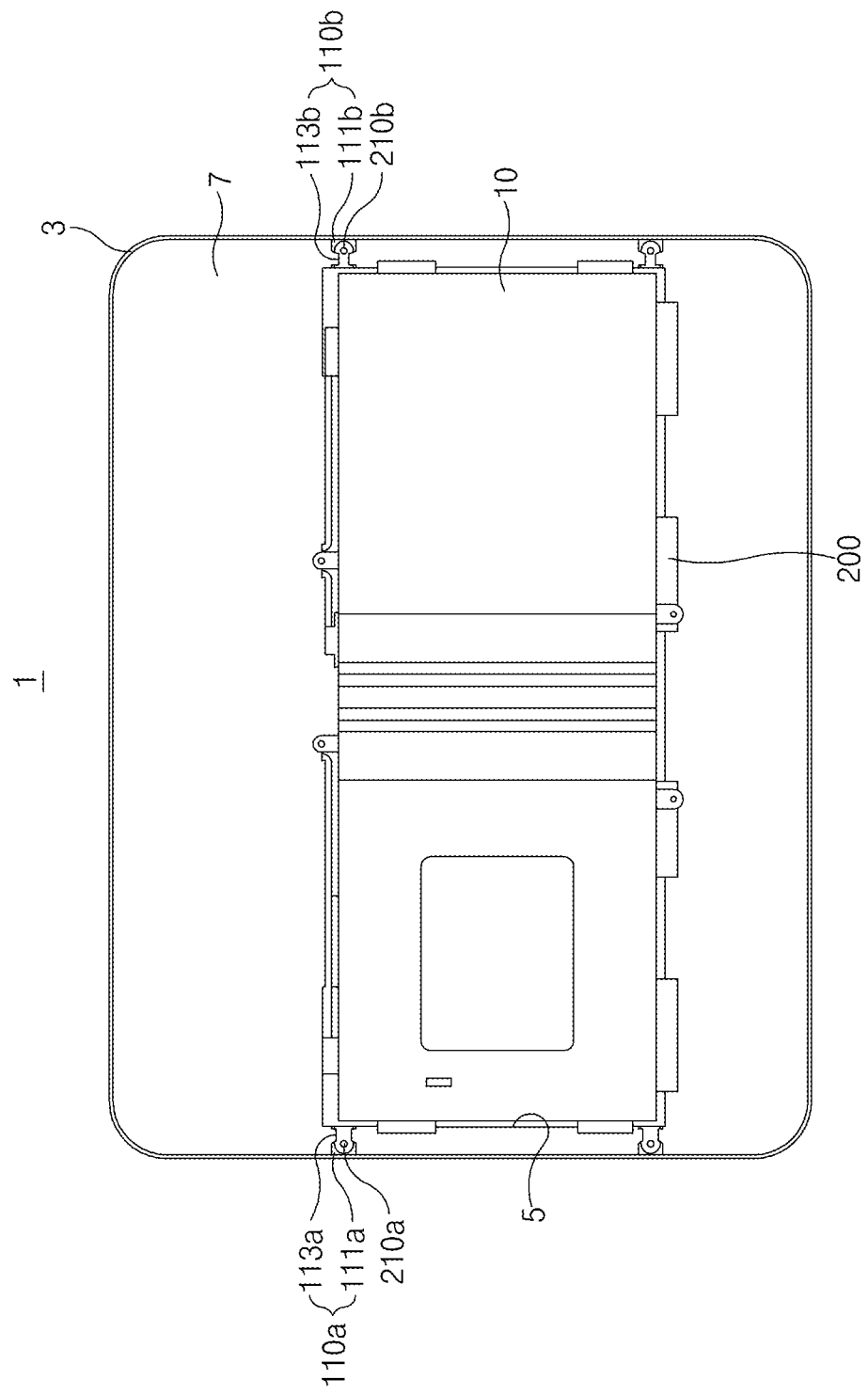
FIG. 5 is a plan diagram illustrating an electronic device according to an embodiment of the present disclosure.

FIG. 5 is a plan diagram illustrating an electronic device according to an embodiment of the present disclosure.

Referring to FIG. 5, hook joining parts 110a and 110b according to an embodiment of the present disclosure may be prepared respectively at both sides facing each other in a front member 7. A joining projection 113a of the hook joining part 110a, which is prepared at one of the sides, may be different from the joining projection 113b of the hook joining part 110b, which is prepared at the other of the sides. For example, the joining projections 113a and 113b may be different in size or other aspects.

As an example, the joining projection 113a of the hook joining part 110a, which is prepared at the one of the sides, may have a height of 0.2 mm~0.3 mm from a side of a joining groove 111a, while the joining projection 113b of the hook joining part 110a, which is prepared at the other side, may have a height of 0.5 mm~0.7 mm from a side of a joining groove 111b.

As such, it may be permissible to dissimilate heights of the joining projections 113a and 113b of the hook joining part 110a, which are prepared at sides of the front member 7. Accordingly, portions of hook members 210a and 210b, which are caught by the joining projections 113a and 113b, may become larger and the battery member 10 may be stably equipped in the electronic device body 3.

Figure 6:
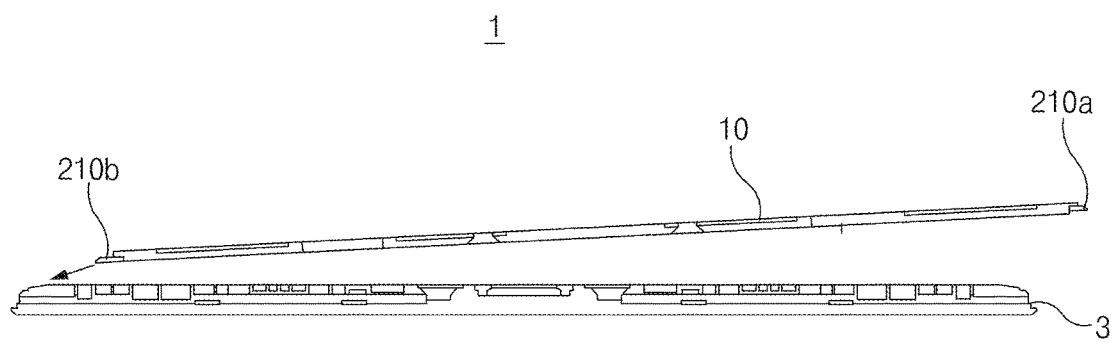
FIG. 6 is a diagram illustrating an operation for equipping a battery member to an electronic device body according to an embodiment of the present disclosure.

FIG. 6 is a diagram illustrating an operation for equipping a battery member to an electronic device body according to an embodiment of the present disclosure.

Figure 7:
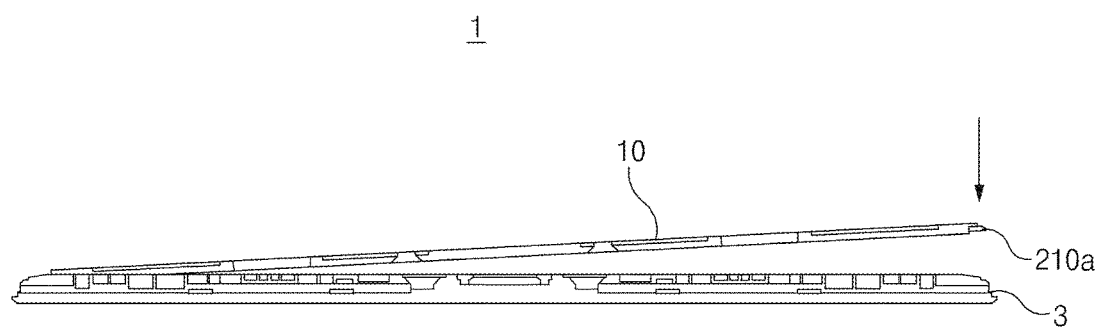
FIG. 7 is a diagram illustrating operations for equipping a battery member to an electronic device body according to an embodiment of the present disclosure.

FIG. 7 is a diagram illustrating operations for equipping a battery member to an electronic device body according to an embodiment of the present disclosure.

Referring to FIGS. 6 and 7, the hook member 210b, which is prepared at the other side of the battery member 10, may be coupled, in a slidable pattern, with the hook joining part 110b (see FIG. 5), which is prepared at the other side, along the arrow direction of FIG. 6, and the hook member 210a, which is prepared at one side of the battery member 10, may be enforcedly inserted into the hook joining part 110a (see FIG. 5), which is prepared at the one side, along the arrow direction of FIG. 7.

During this, the circumference of the hook members 210a and 210b, i.e. the upper part, may be rounded to enable (e.g., guide) the hook member 210b to couple in a slidable pattern between the joining projection 113b and the joining groove 111b of the hook joining part 110b.

According to an embodiment of the present disclosure, even if the caught portions of the hook members are large, it may be permissible to easily insert the hook members 210a and 210b into the hook joining parts 110a and 110b.

According to an embodiment, the present disclosure may be restrictive to the former embodiments and rather modifiable by those skilled in the art if the battery member 10 is coupled with the electronic device body 3 in a form of a hook under the direction and substance of the present disclosure.

According to various embodiments of the present disclosure, it may be effective in curtailing costs for component materials by coupling the hook joining part 110, which is placed in the settling part 5 of the electronic device body 3, with the hook member 210, which is prepared around the battery member 10, in a form of a hook combination.

Additionally, it may be effective in shortening a fabrication time to reduce the number of processing steps and shorten a fabrication time by joining a battery member with an electronic device body in a form of a hook combination.

Additionally, it may be advantageous to stably maintain a state of installment with a battery member in practical use such as repetitive dropping by joining a battery member with an electronic device body in a form of hook combination.

Figure 8:
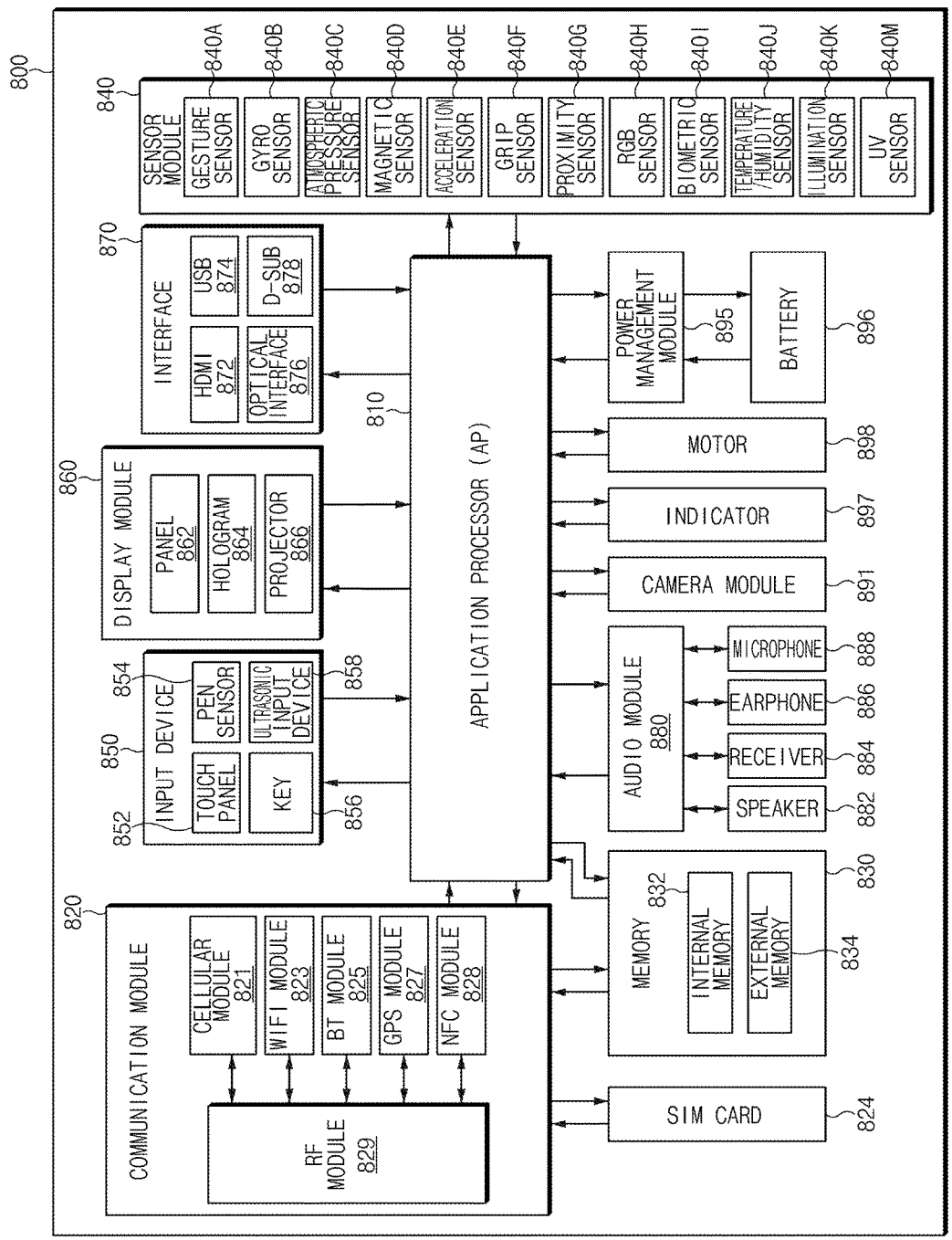
FIG. 8 is a block diagram illustrating an electronic device according to various embodiments of the present disclosure.

FIG. 8 is a block diagram illustrating an electronic device according to various embodiments of the present disclosure. An electronic device 800 may include, for example, a part or all of components of an electronic device 100 shown in FIG. 1.

Referring to FIG. 8, the electronic device 800 may include at least one of one or more Application Processors (APs) 810, a communication module 820, a Subscriber Identification Module (SIM) card 824, a memory 830, a sensor module 840, an input unit 850, a display module 860, an interface 870, an audio module 880, a camera module 891, a power management module 895, a battery 896, an indicator 897, or a motor 898.

The AP 810 may drive an Operating System (OS) or an application to control a plurality of hardware or software components connected to the AP 810 and may process and compute a variety of data including multimedia data. The AP 810 may be implemented with a System on Chip (SoC), for example. According to an embodiment of the present disclosure, the AP 810 may further include a Graphic Processing Unit (GPU).

The communication module 820 may transmit and receive data between other electronic devices connected with the electronic device 800 through a network. According to an embodiment of the present disclosure, the communication module 820 may include a cellular module 821, a Wi-Fi module 823, a Bluetooth (BT) module 825, a GPS module 827, a Near Field Communication (NFC) module 828, and a Radio Frequency (RF) module 829.

The cellular module 821 may provide voice communication, video communication, a character service, or an Internet service through a communication network (e.g., a Long Term Evolution (LTE), an LTE-Advanced (LTE-A), a Code Division Multiple Access (CDMA), a Wideband CDMA (WCDMA), a Universal Mobile Telecommunications System (UMTS), a Wireless Broadband (WiBro), or a Global System for Mobile Communications (GSM), etc.). Also, the cellular module 821 may perform discrimination and authentication of an electronic device within a communication network using a SIM (e.g., the SIM card 824), for example. According to an embodiment of the present disclosure, the cellular module 821 may perform at least some functions that the AP 810 provides. For example, the cellular module 821 may perform at least a portion of a multimedia control function.

According to an embodiment of the present disclosure, the cellular module 821 may include a Communication Processor (CP). Also, the cellular module 821 may be implemented with, for example, an SoC.

According to an embodiment of the present disclosure, the AP 810 or the cellular module 821 (e.g., a CP) may load and process an instruction or data received from nonvolatile memories respectively connected thereto or from at least one of other elements at the nonvolatile memory. Also, the AP 810 or the cellular module 821 may store data received from at least one of other elements or generated by at least one of other elements at a nonvolatile memory.

Each of the Wi-Fi module 823, the BT module 825, the GPS module 827, and the NFC module 828 may include a processor for processing data exchanged through a corresponding module, for example.

According to an embodiment of the present disclosure, at least a part (e.g., two or more components) of the cellular module 821, the Wi-Fi module 823, the BT module 825, the GPS module 827, and the NFC module 828 may be included within one Integrated Circuit (IC) or an IC package. For example, at least a part (e.g., a communication processor corresponding to the cellular module 821 and a Wi-Fi processor corresponding to the Wi-Fi module 823) of processors corresponding to the cellular module 821, the Wi-Fi module 823, the BT module 825, the GPS module 827, and the NFC module 828 may be implemented with one SoC.

The RF module 829 may transmit and receive data, for example, RF signals. Though not shown, the RF module 829 may include a transceiver, a Power Amplifier Module (PAM), a frequency filter, or Low Noise Amplifier (LNA), etc. Also, the RF module 829 may further include various parts for transmitting and receiving an electromagnetic wave in a space in wireless communication, such as conductor or a conducting wire.

According to an embodiment of the present disclosure, at least one of the cellular module 821, the Wi-Fi module 823, the BT module 825, the GPS module 827, or the NFC module 828 may transmit and receive an RF signal through a separate RF module.

The SIM card 824 may be a card that includes a SIM and may be inserted to a slot formed at a specific position of the electronic device. The SIM card 824 may include unique identify information (e.g., Integrated Circuit Card Identifier (ICCID)) or subscriber information (e.g., Integrated Mobile Subscriber Identify (IMSI)).

The memory 830 may include an embedded memory 832 or an external memory 834. For example, the embedded memory 832 may include at least one of a volatile memory (e.g., a Dynamic Random Access Memory (DRAM), a Static RAM (SRAM), a Synchronous DRAM (SDRAM), etc.), or a nonvolatile memory (e.g., a One Time Programmable Read Only Memory (OTPROM), a PROM, an Erasable and Programmable ROM (EPROM), an Electrically Erasable and Programmable ROM (EEPROM), a mask ROM, a flash ROM, a NAND flash memory, a NOR flash memory, etc.).

According to an embodiment of the present disclosure, the embedded memory 832 may be a Solid State Drive (SSD). The external memory 834 may further include a flash drive, for example, a Compact Flash (CF), a Secure Digital (SD), a Micro-SD, a mini-SD, an extreme Digital (xD), or a memory stick. The external memory 834 may be functionally connected with the electronic device 800 through various interfaces. According to an embodiment of the present disclosure, the electronic device 800 may further include storage (or storage medium) such as a hard disk drive.

The sensor module 840 may measure a physical quantity or may detect an operation state of the electronic device 800. The sensor module 840 may convert the measured or detected information to an electric signal. The sensor module 840 may include at least one of a gesture sensor 840A, a gyro sensor 840B, a pressure sensor 840C, a magnetic sensor 840D, an acceleration sensor 840E, a grip sensor 840F, a proximity sensor 840G, a color sensor 840H (e.g., Red, Green, Blue (RGB) sensor), a living body sensor 840I, a temperature/humidity sensor 840J, an illuminance sensor 840K, or an Ultraviolet (UV) sensor 840M. Additionally or generally, though not shown, the sensor module 840 may further include an E-nose sensor, an ElectroMyoGraphy sensor (EMG) sensor, an ElectroEncephaloGram (EEG) sensor, an ElectroCardioGram (ECG) sensor, a photoplethysmography (PPG) sensor, an InfraRed (IR) sensor, an iris sensor, or a fingerprint sensor, for example. The sensor module 840 may further include a control circuit for controlling at least one or more sensors included therein.

The input unit 850 may include a touch panel 852, a digital pen sensor 854, a key 856, or an ultrasonic input unit 858. The touch panel 852 may recognize a touch input using at least one of a capacitive type, a resistive type, an infrared type, or an ultrasonic wave type. Also, the touch panel 852 may further include a control circuit. In case of the capacitive type, a physical contact or proximity recognition is possible. The touch panel 852 may further include a tactile layer. In this case, the touch panel 852 may provide a tactile reaction to a user.

The digital pen sensor 854 may be implemented, for example, using a method, which is the same as or similar to receiving a user touch input, or using a separate sheet for recognition. The key 856, for example, may include a physical button, an optical key, or a keypad. The ultrasonic input unit 858 may be a device, which allows the electronic device 800 to detect a sound wave using a microphone (e.g., a microphone 888) and to determine data through an input tool generating an ultrasonic signal, and enables wireless recognition. According to an embodiment of the present disclosure, the electronic device 800 may receive a user input from an external unit (e.g., a computer or a server) connected thereto using the communication module 820.

The display module 860 may include a panel 862, a hologram device 864, or a projector 866. The panel 862 may be a liquid-crystal display (LCD) or an Active-Matrix Organic Light-Emitting Diode (AMOLED). The panel 862, for example, may be implemented to be flexible, transparent, or wearable. The panel 862 and the touch panel 852 may be implemented with one module. The hologram device 864 may show a three-dimensional image in a space using interference of light. The projector 866 may project light onto a screen to display an image. The screen, for example, may be positioned in the inside or outside of the electronic device 800. According to an embodiment of the present disclosure, the display module 860 may further include a control circuit for controlling the panel 862, the hologram device 864, or the projector 866.

The interface 870, for example, may include a High-Definition Multimedia Interface (HDMI) 872, a Universal Serial Bus (USB) 874, an optical interface 876, or a D-sub-miniature (D-sub) 878. The interface 870, for example, may include a Mobile High Definition Link (MHL) interface, an SD card/Multi-media card (MMC) interface, or an Infrared Data Association (IrDA) standard interface.

The audio module 880 may convert a sound and an electric signal in dual directions. The audio module 880, for example, may process sound information that is input or output through a speaker 882, a receiver 884, an earphone 886, or the microphone 888.

The camera module 891 may be a unit that shoots a still picture and a moving picture. According to an embodiment of the present disclosure, the camera module 891 may include one or more image sensors (e.g., a front sensor or a rear sensor), a lens (not shown), an Image Signal Processor (ISP) (not shown), or a flash (not shown) (e.g., an LED or a xenon lamp).

The power management module 895 may manage power of the electronic device 800. Though not shown, the power management module 895, for example, may include a Power Management IC (PMIC) a charger IC, or a battery or fuel gauge.

The PMIC, for example, may be embedded in an IC or an SoC semiconductor. A charging method may be classified as a wired method or a wireless method. The charger IC may charge a battery and may prevent an overvoltage or an overcurrent from being input from a charger. According to an embodiment of the present disclosure, the charger IC may include a charger IC for at least one of a wired charging method and a wireless charging method. The wireless charging method, for example, may be a magnetic resonance method, a magnetic induction method, or an electromagnetic method. An additional circuit for wireless charging, for example, circuits such as a coil loop, a resonance circuit, or a rectifier may be further provided.

The battery gauge, for example, may measure a capacity of the battery 896, a voltage, a current, or a temperature, for example during charging. The battery 896 may store or generate electricity and may supply power to the electronic device 800 using the stored or generated electricity. The battery 896, for example, may include a rechargeable battery or a solar battery.

The indicator 897 may display information regarding a state of the electronic device 800 or a part (e.g., the AP 9810) thereof. For example, the indicator 897 may display a booting state, a message state, or a charging state. The motor 898 may convert an electric signal to mechanical vibration. Though not shown, the electronic device 800 may include a processing unit (e.g., a GPU) for supporting a mobile TV. The processing unit for supporting the mobile TV, for example, may process media data that is based on the standard of Digital Multimedia Broadcasting (DMB), Digital Video Broadcasting (DVB), or media flow.

Each of the above components of the electronic device according to an embodiment of the present disclosure may be implemented using one or more components, and a name of a relevant component may vary depending on the kind of the electronic device. The electronic device according to various embodiments of the present disclosure may include at least one of the above components. Also, a part of the components may be omitted, or additional other components may be further included. Also, some of the components of the electronic device according to the present disclosure may be combined to form one entity, thereby making it possible to perform the functions of the relevant components substantially the same as before the combination.

The term "module" used for the present disclosure, for example, may mean a unit including one of hardware, software, and firmware or a combination of two or more thereof. A "module," for example, may be interchangeably used with terminologies such as a unit, logic, a logical block, a component, a circuit, etc. The "module" may be a minimum unit of a component integrally configured or a part thereof. The "module" may be a minimum unit performing one or more functions or a portion thereof. The "module" may be implemented mechanically or electronically. For example, the "module" according to the present disclosure may include at least one of an Application-Specific IC (ASIC) chip performing certain operations, a Field-Programmable Gate Arrays (FPGAs), or a programmable-logic device, known or to be developed in the future.

According to an embodiment of the present disclosure, at least a part of an apparatus (e.g., modules or functions thereof) or a method (e.g., operations) according to the present disclosure, for example, may be implemented by instructions stored in a computer-readable storage media in the form of a programmable module. The instruction, when executed by one or more processors, may perform a function corresponding to the instruction. At least a part of the programming module may include the following for performing one or more functions: a module, a program, a routine, a set of instructions, or a process.

A computer-readable recording medium may include a hard disk, a magnetic media such as a floppy disk and a magnetic tape, an optical media such as Compact Disc ROM (CD-ROM) and a DVD, a magneto-optical media such as a floptical disk, and the following hardware devices specifically configured to store and perform a program instruction (e.g., a programming module): ROM, RAM, and a flash memory. Also, a program instruction may include not only a mechanical code such as things generated by a compiler but also a high-level language code executable on a computer using an interpreter. The above hardware unit may be configured to operate via one or more software modules for performing an operation of the present disclosure, and vice versa.

A module or a programming module according to an embodiment of the present disclosure may include at least one of the above elements, or a part of the above elements may be omitted, or additional other elements may be further included. Operations performed by a module, a programming module, or other elements according to an embodiment of the present disclosure may be executed sequentially, in parallel, repeatedly, or in a heuristic method. Also, a portion of operations may be executed in different sequences, omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
an electronic device body including a settling part located at a side of the electronic device body;
a front member formed in the side of the electronic device body;
a battery member coupled to the settling part of the electronic device body;
two or more hook joining parts located at sides of the electronic device body, the two or more hook joining parts each comprising a plurality of hook shaped joining projections extending toward each other;
two or more hook members respectively located around the battery member and detachably coupled with the two or more hook joining parts; and
a battery frame part that is located at one or more sides of the battery member,
wherein the battery frame part is formed in a body together with the battery member,
wherein the two or more hook members are located in the battery frame part, and
wherein the two or more hook joining parts are located in the front member.

2. The electronic device of claim 1, wherein the two or more hook members are formed in a body together with the battery frame part.

3. The electronic device of claim 1, wherein the battery member is configured to supply power to the electronic device.

4. The electronic device of claim 1, wherein the two or more hook members comprise a rounded edge.

5. The electronic device of claim 1, wherein the two or more hook joining parts are coupled with the settling part.

6. The electronic device of claim 4, wherein the two or more hook joining parts couple with the settling part.

7. The electronic device of claim 6,
wherein the two or more hook joining parts include a joining groove indented from a side of the front member and configured to couple with the two or more hook members, and
wherein the plurality of hook shaped joining projections protrude respectively from sides of the joining groove and are configured to prevent separation of the two or more hook members from the joining groove.

8. The electronic device of claim 7, wherein the two or more hook members are coupled in a slidable pattern between the joining groove and the plurality of hook shaped joining projections.

9. The electronic device of claim 7, wherein the plurality of hook shaped joining projections are formed at an outer end of the sides of the joining groove.

10. The electronic device of claim 9, wherein the plurality of hook shaped joining projections are further configured to have an outer circumference having an end that is rounded.

11. The electronic device of claim 9,
wherein, the two or more hook members are configured to pass the plurality of hook shaped joining projections from an outside of the joining groove into an inside of the joining groove if the two or more hook members are enforcedly inserted into the joining groove, and
wherein the plurality of hook shaped joining projections are elastically deformable.

12. An electronic device comprising:
an electronic device body including a settling part located at a side of the electronic device body;
a front member formed in the side of the electronic device body;

a battery member coupled to the settling part of the electronic device body;

two or more hook joining parts located at a first side and a second side of the electronic device body, the two or more hook joining parts each comprising a plurality of hook shaped joining projections extending toward each other; and two or more hook members located respectively at a first side and a second side of the battery member and detachably coupled with the two or more hook joining parts, wherein the two or more hook joining parts are located in the front member, wherein the two or more hook joining parts are coupled respectively with a first side and a second side of the settling part, wherein the two or more hook joining parts include a joining groove indented in a side of the electronic device body and configured to couple with the two or more hook members, wherein the plurality of hook shaped joining projections protrude respectively from sides of the joining groove and are configured to prevent separation of the two or more hook members from the joining groove, and wherein the plurality of hook shaped joining projections of the two or more hook joining parts coupled with the first side of the settling part are different, in size, from the plurality of hook shaped joining projections of the two or more hook joining parts coupled with the second side of the settling part.

13. The electronic device of claim 12, wherein the two or more hook joining parts are configured to:

dissimilate a height of the plurality of hook shaped joining projections of the two or more hook joining parts coupled with the first side of the settling part and a height of the plurality of hook shaped joining projections of the two or more hook joining parts coupled with the second side of the settling part, and adjust portions caught by the two or more hook members respective to the plurality of hook shaped joining projections of the two or more hook joining parts coupled with the first side and the second side of the settling part.

* * * * *